(12) United States Patent
Kitajima et al.

(10) Patent No.: US 12,043,177 B2
(45) Date of Patent: *Jul. 23, 2024

(54) REAR-VIEW MIRROR DEVICE MOUNTED IN A VEHICLE, VEHICLE-MOUNTED DISPLAY DEVICE, VEHICLE-MOUNTED DISPLAY SYSTEM

(71) Applicant: PANASONIC INTELLECTUAL PROPERTY MANAGEMENT CO., LTD., Osaka (JP)

(72) Inventors: Norihito Kitajima, Kanagawa (JP); Tomoaki Yamamoto, Kanagawa (JP); Yuji Matsumoto, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,679

(22) Filed: May 10, 2023

(65) Prior Publication Data

US 2023/0271553 A1 Aug. 31, 2023

Related U.S. Application Data

(63) Continuation of application No. 17/686,829, filed on Mar. 4, 2022, now Pat. No. 11,708,028, which is a
(Continued)

(30) Foreign Application Priority Data

Mar. 29, 2018 (JP) .................................. 2018-064475

(51) Int. Cl.
*B60R 1/08* (2006.01)
*B60R 1/04* (2006.01)
(Continued)

(52) U.S. Cl.
CPC .................. *B60R 1/08* (2013.01); *B60R 1/04* (2013.01); *B60R 1/1207* (2013.01); *B60R 11/04* (2013.01);
(Continued)

(58) Field of Classification Search
CPC ..... B60R 1/04; B60R 1/08; B60R 2001/1215; B60R 2001/1253; B60R 2300/8066
(Continued)

(56) References Cited

U.S. PATENT DOCUMENTS 3,427,096 A 2/1969 Dykema
3,563,638 A 2/1971 Panozzo
(Continued)

FOREIGN PATENT DOCUMENTS

JP 2017-165211 9/2017
WO 2011/044312 4/2011

*Primary Examiner* — Ricky D Shafer
(74) *Attorney, Agent, or Firm* — GREENBLUM & BERNSTEIN, P.L.C.

(57) ABSTRACT

A vehicle-mounted display device includes a glass plate that includes a first arcuate surface at a first outer circumferential edge part, the first arcuate surface facing a front surface side, a casing that supports the glass plate from a rear surface side, the casing including a housing and a frame that projects from the housing, and a display unit stored in the casing configured to output a display light toward the glass plate. A rear surface of the glass plate and a front surface of the frame face each other at a spaced distance. The frame further includes a projection that projects, within the spaced distance, from the front surface of the frame toward the rear surface of the glass plate at a second outer circumferential edge part of the front surface of the frame, and the projection includes a second arcuate surface.

20 Claims, 9 Drawing Sheets

Related U.S. Application Data continuation of application No. 16/366,580, filed on Mar. 27, 2019, now Pat. No. 11,299,096.

(51) Int. Cl.
  *B60R 1/12* (2006.01)
  *B60R 11/04* (2006.01)

(52) U.S. Cl.
  CPC .......... *B60R 2001/1253* (2013.01); *B60R 2300/8066* (2013.01)

(58) Field of Classification Search
  USPC ............... 359/514, 839, 863, 864, 868, 871
  See application file for complete search history.

(56) References Cited

U.S. PATENT DOCUMENTS

| | | |
|---|---|---|
| 3,656,830 A | 4/1972 | Kurschner |
| 5,687,035 A | 11/1997 | Lang |
| 8,508,831 B2 | 8/2013 | De Wind |
| 8,730,553 B2 | 5/2014 | De Wind et al. |
| 8,827,517 B2 | 9/2014 | Cammenga |
| 8,922,867 B2 | 12/2014 | De Wind et al. |
| 9,090,212 B2 | 7/2015 | De Wind et al. |
| 9,637,055 B2 | 5/2017 | De Wind et al. |
| 9,963,073 B1 | 5/2018 | Caraan |
| 10,124,732 B2 | 11/2018 | De Wind et al. |
| 10,859,745 B2 | 12/2020 | Taguchi et al. |
| 11,299,096 B2 * | 4/2022 | Kitajima ............... B60R 1/04 |
| 11,708,028 B2 * | 7/2023 | Kitajima ............... B60R 1/12 359/841 |
| 2007/0103801 A1 | 5/2007 | Schmidt |
| 2012/0229882 A1 | 9/2012 | Fish, Jr |
| 2012/0236388 A1 | 9/2012 | De Wind et al. |
| 2014/0313563 A1 | 10/2014 | Uken |
| 2014/0327951 A1 | 11/2014 | De Wind et al. |
| 2015/0116810 A1 | 4/2015 | De Wind et al. |
| 2015/0329050 A1 | 11/2015 | De Wind et al. |
| 2016/0264054 A1 | 9/2016 | Uken |
| 2017/0232899 A1 | 8/2017 | De Wind et al. |
| 2017/0297498 A1 | 10/2017 | Larson |
| 2018/0210124 A1 | 7/2018 | Taguchi et al. |
| 2018/0319339 A1 | 11/2018 | Baur |

* cited by examiner

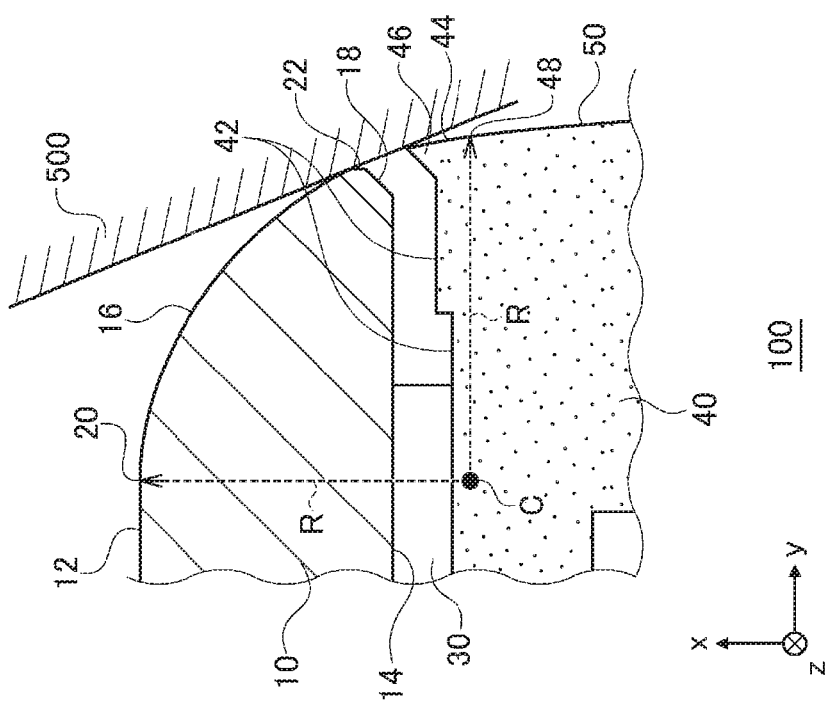
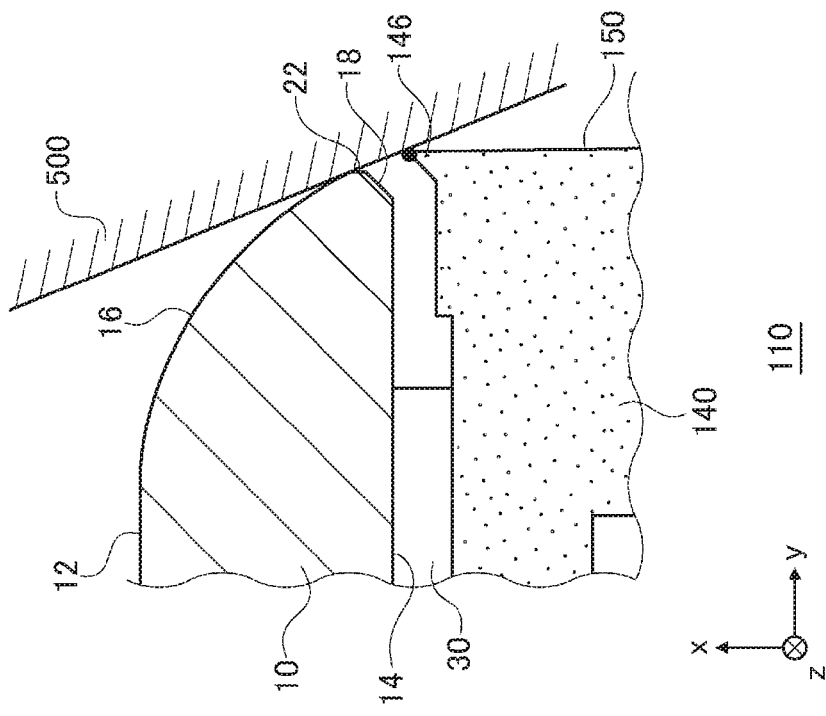

FIG.8

|  | GLASS A | GLASS B | REMARKS |
|---|---|---|---|
| REFRACTIVE INDEX | 1.5 | 1.5 | TENDENCY TO REFLECT LIGHT |
| TRANSMITTANCE | 90% OR HIGHER | 90% OR HIGHER | TENDENCY TO TRANSMIT LIGHT |
| LINEAR EXPANSION COEFFICIENT ($\times 10^{-6}/°C$) | 8.5 | 8.5 | MAGNITUDE OF DEFORMATION AT TEMPERATURE CHANGE |
| SOFTENING TEMPERATURE (°C) | 720 | 800 | TEMPERATURE AT WHICH GLASS SOFTENES |
| SPECIFIC GRAVITY | 2.5 | 2.5 | HEAVINESS |
| VICKERS HARDNESS (HV) | 500 | 650 | DIFFICULTY TO BE DAMAGED (FORCE REQUIRED TO DEPRESS GLASS BY PRESSING DIAMOND AGAINST SURFACE) |
| YOUNG'S MODULUS (Gpa) | 70 | 70 | DIFFICULTY TO EXTEND |
| RIGIDITY MODULUS (Gpa) | 30 | 30 | DIFFICULTY TO BEND |
| POISSON RATIO | 0.23 | 0.23 | RATIO BETWEEN TRANSVERSAL CONTRACTION AND LONGITUDINAL EXTENSION |
| BENDING FRACTURE STRENGTH (MPa) | 40 | 800 | DIFFICULTY TO BE BROKEN WHEN BENT |

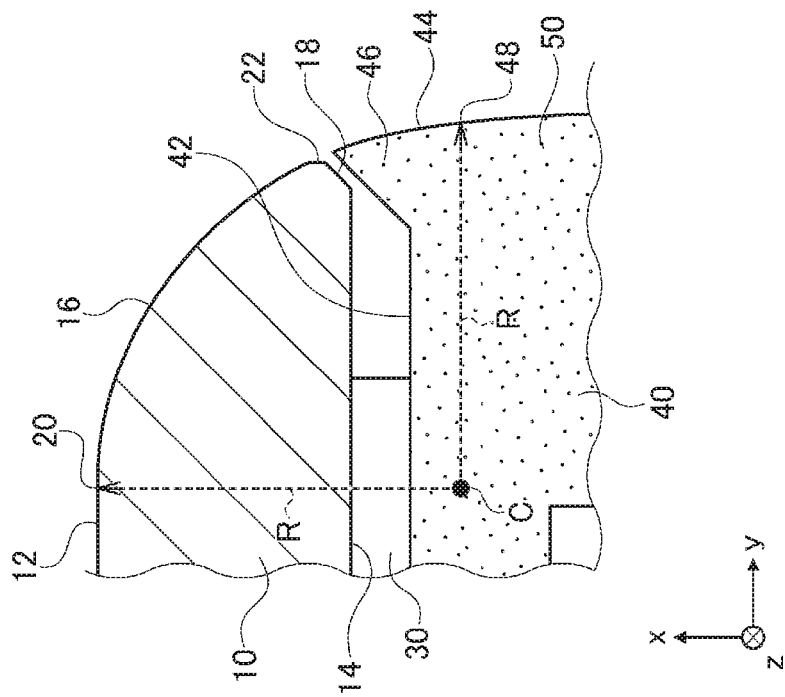
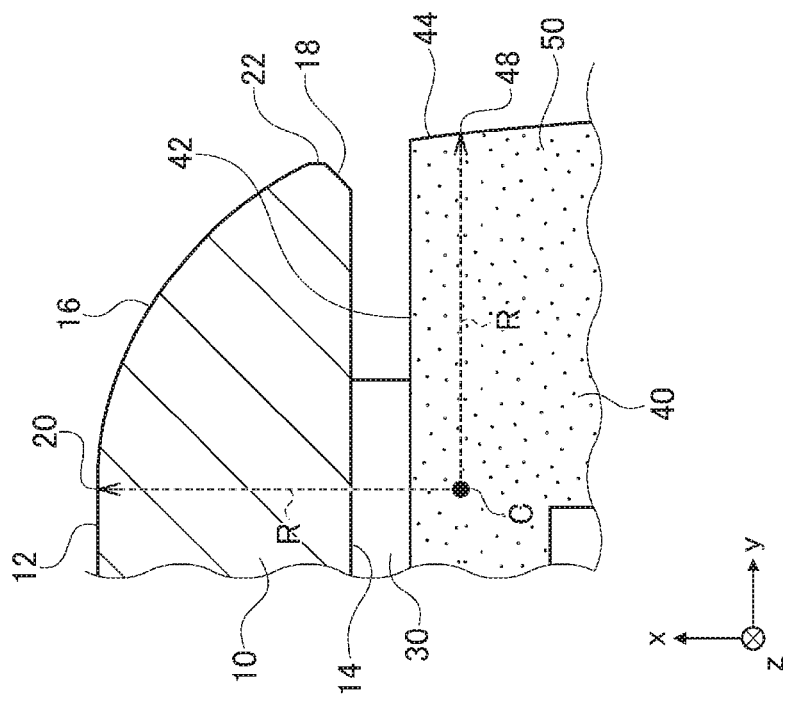

REAR-VIEW MIRROR DEVICE MOUNTED IN A VEHICLE, VEHICLE-MOUNTED DISPLAY DEVICE, VEHICLE-MOUNTED DISPLAY SYSTEM

CROSS-REFERENCE TO RELATED APPLICATIONS

This present application is a Continuation of U.S. patent application Ser. No. 17/686,829, filed Mar. 4, 2022, which is a continuation of U.S. patent application Ser. No. 16/366,580 filed Mar. 27, 2019 (now U.S. Pat. No. 11,299,096 issued on Apr. 12, 2022), which claims the benefit of Japanese Pat. Appl. No. 2018-064475 filed Mar. 29, 2018. The entire disclosure of each of the above-identified documents, including the specification, drawings, and claims is incorporated herein by reference in its entirety.

BACKGROUND

1. Field

The present disclosure relates to a rear-view mirror device, a vehicle-mounted display device, and a vehicle-mounted display system mounted in a vehicle.

2. Description of the Related Art

A rear-view mirror device is provided in a vehicle at a position above the front window. A glass plate is provided on the frontmost surface of the rear-view mirror device, and the glass plate faces occupants in the vehicle. Further, an outwardly curved arcuate shape is provided at the outer circumferential edge of the glass plate (see, for example, patent document 1).
[Patent Document 1] WO11/044312

The arcuate shape at the outer circumferential edge of the glass plate is defined by the center of the arc (hereinafter, referred to as "arc center") and the radius of the arc (hereinafter, referred to as "arc radius"). In order to maintain the arcuate shape, the thickness of the glass plate is made to be equal to or larger than the arc radius so that the larger the arc radius, the larger the thickness of the glass plate. A larger thickness of the glass plate increases the weight and increases the cost.

SUMMARY

The disclosure addresses the above-described issue, and a general purpose thereof is to provide a technology of inhibiting the thickness of the glass plate from being increased, while the arcuate shape at the outer circumferential edge of the glass plate is maintained at the same time.

A rear-view mirror device according to an embodiment of the disclosure includes: a glass plate that includes a first arcuate surface at an outer circumferential edge part, the first arcuate surface facing a front surface side; a casing that supports the glass plate from a rear surface side and includes a second arcuate surface in a portion toward the glass plate; and a reflective layer provided between the casing and the glass plate. A center and a radius of the second arcuate surface are made to be identical to a center and a radius of the first arcuate surface, respectively.

Another embodiment of the present disclosure relates to a vehicle-mounted display device. The device includes: a glass plate that includes a first arcuate surface at an outer circumferential edge part, the first arcuate surface facing a front surface side; a casing that supports the glass plate from a rear surface side and includes a second arcuate surface in a portion toward the glass plate; and a display unit stored in the casing and outputting a display light toward the glass plate. A center and a radius of the second arcuate surface are made to be identical to a center and a radius of the first arcuate surface, respectively.

Another embodiment of the present disclosure relates to a vehicle-mounted display system. The vehicle-mounted display system includes: an imaging device that captures an image; and a vehicle-mounted display device that displays the image captured by the imaging device. The vehicle-mounted display device includes: a glass plate that includes a first arcuate surface at an outer circumferential edge part, the first arcuate surface facing the front surface side; a casing that supports the glass plate from a rear surface side and includes a second arcuate surface in a portion toward the glass plate; and a display unit stored in the casing and outputting a display light reflecting the image toward the glass plate. A center and a radius of the second arcuate surface are made to be identical to a center and a radius of the first arcuate surface, respectively.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 6A-6B show an advantage in the vehicle-mounted display device of FIG. 5;

FIG. 8 shows physical property values of glass used in the glass plate of FIG. 5; and FIGS. 9A-9B show another structure of the vehicle-mounted display device of FIG. 5.

DETAILED DESCRIPTION

The invention will now be described by reference to the preferred embodiments. This does not intend to limit the scope of the present invention, but to exemplify the invention.

A summary will be given before describing the invention in specific details. An embodiment of the disclosure relates to a vehicle-mounted display system mounted in a vehicle in place of a rear-view mirror device. In a vehicle-mounted display system, an imaging device is provided in a rear portion of the vehicle. A vehicle-mounted display device is provided in the vehicle on the upper side of the front window. The vehicle-mounted display device displays an image captured by the imaging device. As in the case of the rear-view mirror device mentioned above, the a glass plate is provided on the frontmost surface of the vehicle-mounted display device facing occupants in the vehicle. The glass plate like this could collide with the head of an occupant.

Thus, "UN Regulation No. 46 Indirect Vision Devices" requires providing an arcuate shape having an arc diameter of 2.5 mm or larger at the outer circumferential edge of the glass plate. The thickness of the glass plate is made to be equal to or larger than the arc diameter. In the case of the aforementioned requirement, therefore, the thickness of the glass plate will be 2.5 mm or larger. The glass plate like this will be heavy and costs much.

The embodiment addresses the purpose of inhibiting the thickness of the glass plate from being increased while also maintaining the arcuate shape at the outer circumferential edge of the glass plate at the same time, by making the thickness of the glass plate smaller than the arc diameter and provides the casing that supports the glass plate from the rear surface side with an arcuate shape continuous with the arcuate shape provided in the glass plate. In other words, the embodiment meets the requirement of providing an arcuate shape having an arc diameter of 2.5 mm or larger not by the glass plate alone but by a combination of the glass plate and the casing. The terms "parallel" and "orthogonal" in the following description not only encompass completely parallel or orthogonal but also encompass slightly off-parallel and slightly non-orthogonal within the margin of error. The term "substantially" means identical within certain limits.

Figure 1:
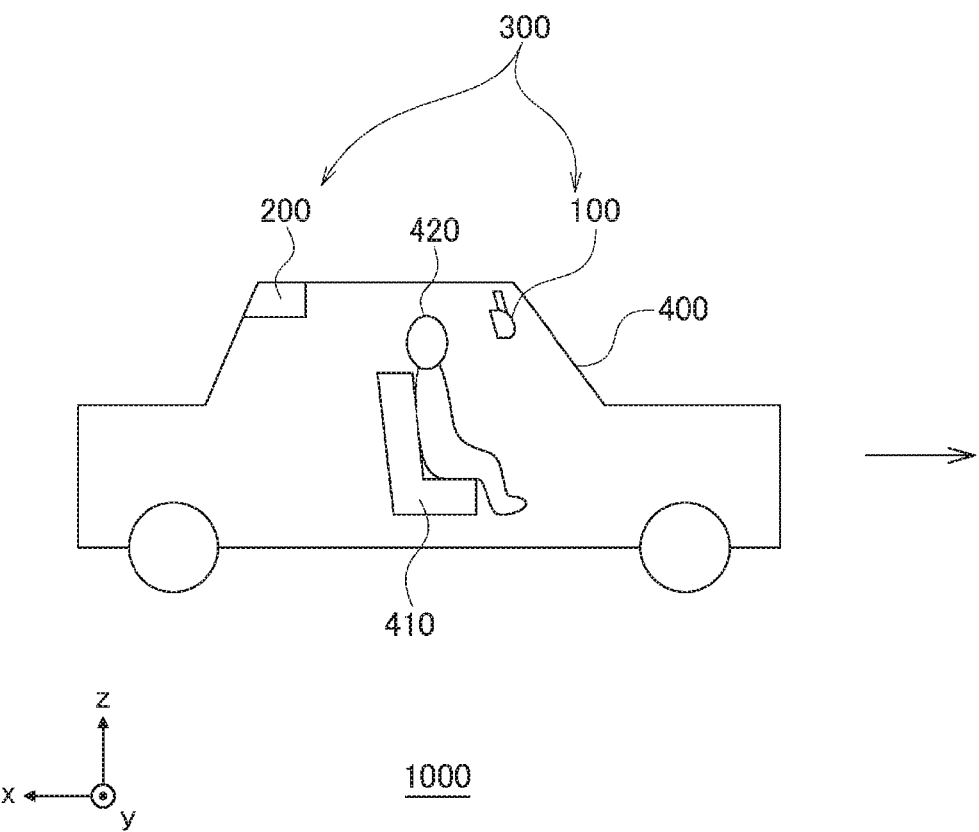
FIG. 1 shows a structure of a vehicle according to an embodiment.

FIG. 1 shows a structure of a vehicle 1000. The right side of FIG. 1 represents the front side of the vehicle 1000. As shown in FIG. 1, an orthogonal coordinate system including an x axis, y axis, and a z axis is defined. The x axis and y axis are orthogonal to each other. The x axis extends in the longitudinal direction of the vehicle 1000, and the y axis extends in the horizontal direction of the vehicle 1000. The z axis is perpendicular to the x axis and y axis and extends in the direction of height of the vehicle 1000. The positive directions of the x axis, y axis, and z axis are defined in the directions of arrows in FIG. 1, and the negative directions are defined in the directions opposite to those of the arrows. The positive direction of the x axis may be referred to as "rear", "rearward", the negative direction of the x axis may be referred to as "front", "frontward", the positive direction of the y axis may be referred to as "right", "rightward", the negative direction of the y axis may be referred to as "left", "leftward", the positive direction of the z axis may be referred to as "above", "upper side", and the negative direction of the z axis may be referred to as "below", "lower side".

The imaging device 200 is provided in a rear portion of the vehicle 1000 and images a scene behind the vehicle 1000. The imaging device 200 may be directly connected to the vehicle-mounted display device 100 or connected to the vehicle-mounted display device 100 via an Electronic Control Unit (ECU) (not shown). The imaging device 200 outputs the captured image to the vehicle-mounted display device 100. The vehicle-mounted display device 100 and the imaging device 200 are included in the vehicle-mounted display system 300.

The vehicle-mounted display device 100 is provided inside the vehicle 1000 and on the upper side of a front window 400. The position where the vehicle-mounted display device 100 is provided is the position where the rear-view mirror device is provided in the related art. Inside the vehicle 1000, a seat 410 is provided rearward of the vehicle-mounted display device 100, and an occupant 420 is seated in the seat 410. When the seat 410 is the driver's seat, the occupant 420 is the driver. The vehicle-mounted display device 100 receives an image from the imaging device 200 and displays the image for the occupant of the vehicle 1000. Therefore, the vehicle-mounted display device 100 displays the image rearward. In the following description, the positive direction of the x axis, i.e., "rear", "rearward", may be referred to as "front surface side", and the negative direction of the x axis, i.e., "front", "frontward", may be referred to as "rear surface side".

Figure 2A:
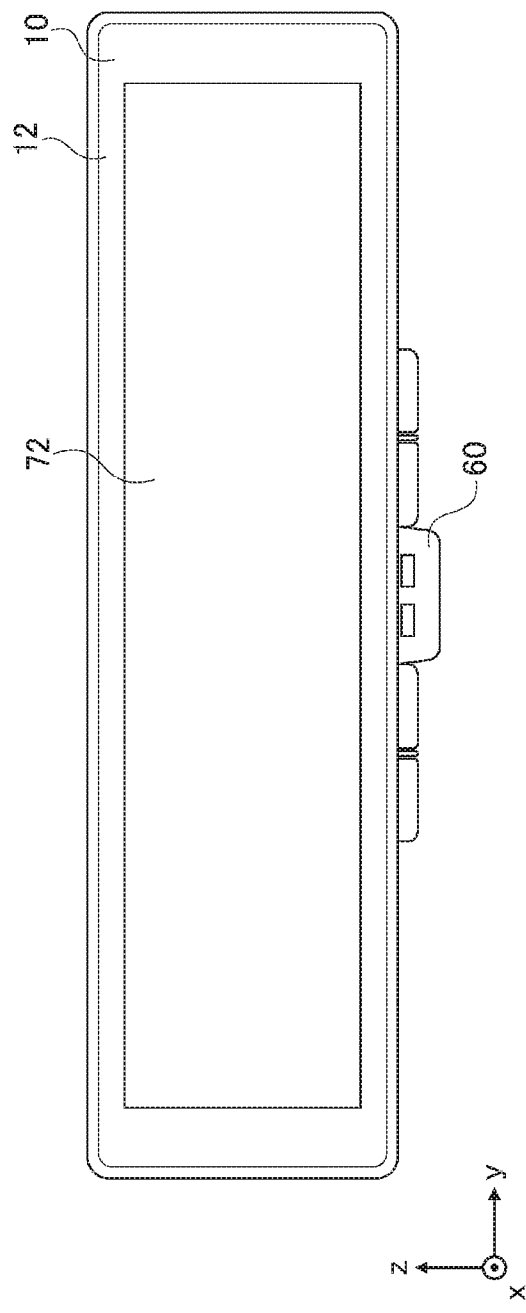
FIGS. 2A-2B show an appearance of the vehicle-mounted display device of FIG. 1.
Figure 2B:
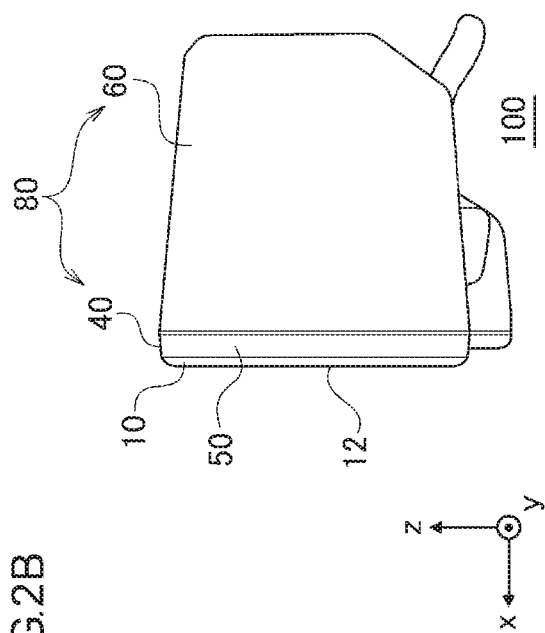
Figure 3:
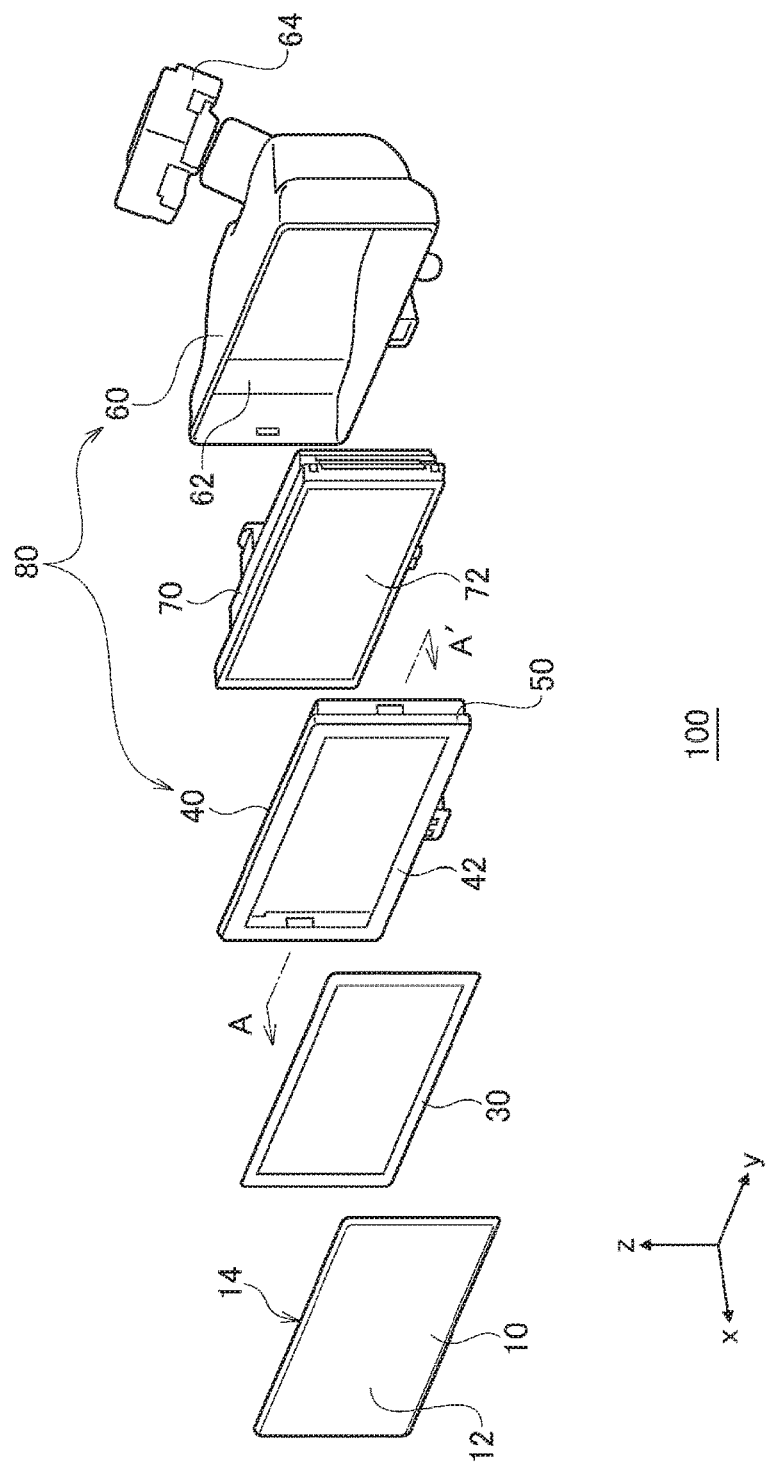
FIG. 3 is an exploded perspective view showing a structure of the vehicle-mounted display device of FIG. 1.

FIGS. 2A-2B show an appearance of the vehicle-mounted display device 100. FIG. 3 is an exploded perspective view showing a structure of the vehicle-mounted display device 100. The vehicle-mounted display device 100 includes a glass plate 10, a double-sided adhesive tape 30, a frame 40, a housing 60, and a display unit 70. The frame 40 and the housing 60 are included in a casing 80. The casing 80 may have an integrated structure. The glass plate 10 has a plate shape that extends on the x-z plane and includes a first surface 12 provided on the front surface side and a second surface 14 provided on the rear surface side. The detail of the shape of the glass plate 10 will be discussed later.

The frame 40 is provided on the rear surface side of the glass plate 10 and supports the second surface 14 of the glass plate from the rear surface side. The frame 40 includes an opposing surface 42 having a frame shape on the y-z pane and a side surface 50 extending from the outer circumferential edge of the opposing surface 42 toward the rear surface side. The opposing surface 42 represents the front surface of the frame 40, and the double-sided adhesive tape 30 having the same shape as the opposing surface 42 is adhesively attached to the opposing surface 42. The double-sided adhesive tape 30 is also adhesively attached to the second surface 14 of the glass plate 10 so that the double-sided adhesive tape 30 bonds the glass plate 10 and the frame 40.

The housing 60 has a box shape that opens on the front surface side and includes a storage space 62 inside. The storage space 62 stores the display unit 70. The display unit 70 is, for example, a liquid crystal display or an organic electro-luminescence display and has a box shape. A display surface 72 provided on the front surface side of the display unit 70 emits a display light presenting an image captured by the imaging device 200 of FIG. 1 toward the glass plate 10. In a condition in which the storage space 62 stores the display unit 70, the frame 40 is set in the opening of the housing 60. Further, a support 64 for fitting the housing 60 inside the vehicle 1000 of FIG. 1 is provided on the rear surface side of the housing 60.

Figure 4:
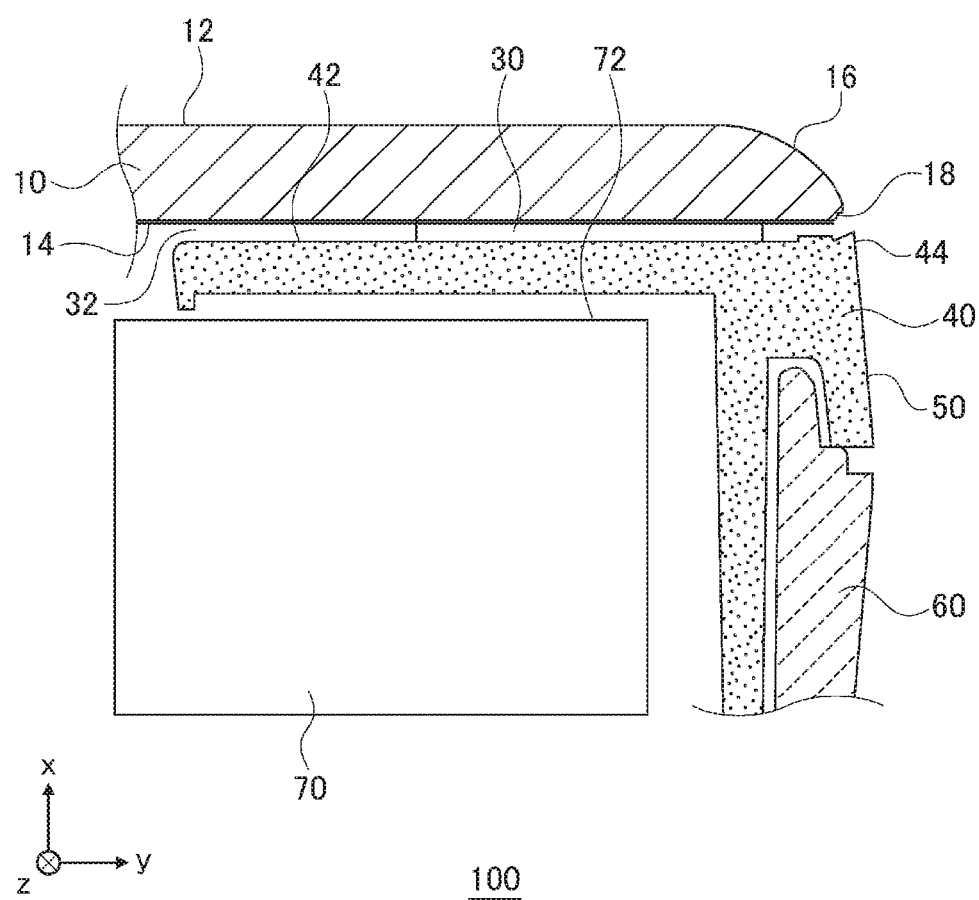
FIG. 4 is an exploded perspective view showing a structure of the vehicle-mounted display device of FIG. 3.
Figure 5:
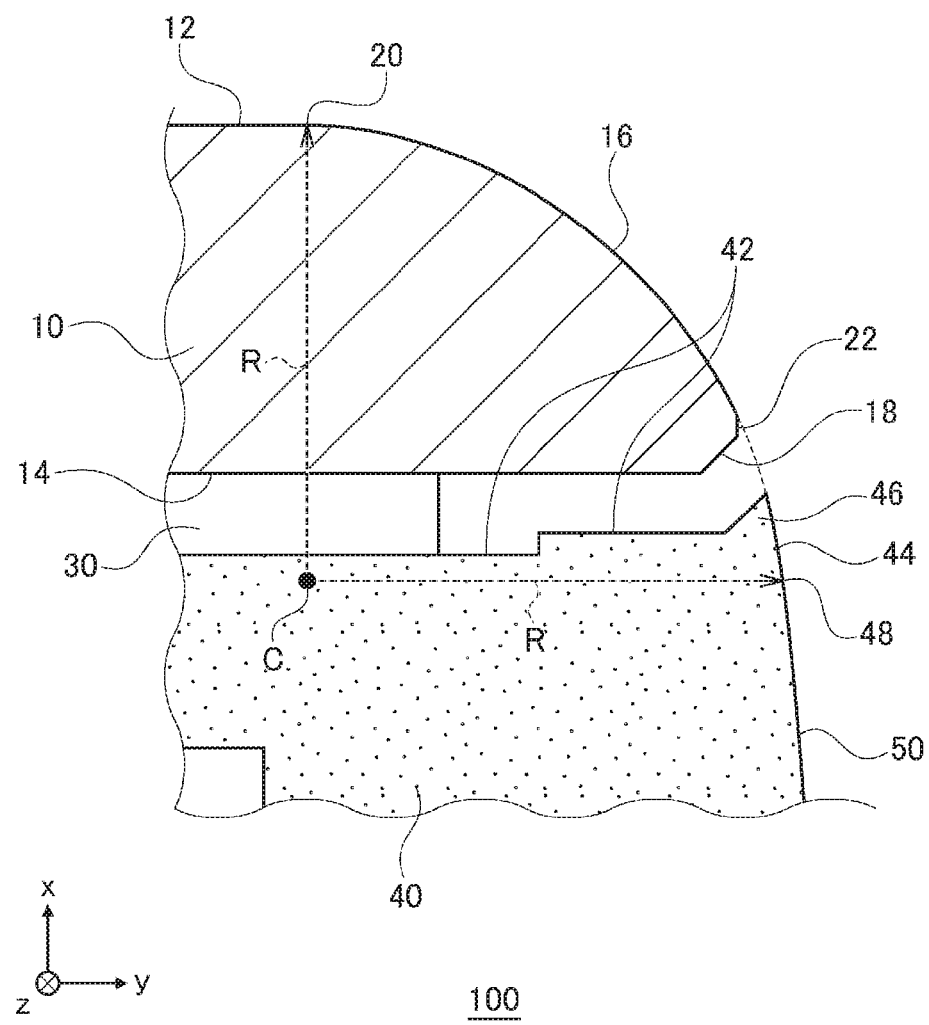
FIG. 5 is an enlarged cross-sectional view showing a structure of the vehicle-mounted display device of FIG. 4.

FIG. 4 is an exploded perspective view showing a structure of the vehicle-mounted display device 100 and is a partial cross-sectional view showing the right portion of the cross section in the y axis direction along line A-A' of FIG. 3. The left portion of the cross section in the y axis direction along line A-A' and the ends of the cross section in the x axis direction also have a similar structure. FIG. 5 is an enlarged cross-sectional view showing a structure of the vehicle-mounted display device 100 and is a cross-sectional view showing the vicinity of the right portion of the glass plate 10 in FIG. 3 on an enlarged scale.

On the front surface side of the glass plate 10, the first arcuate surface 16 is provided at the outer circumferential edge bounding the first surface 12. The first arcuate surface 16 has an arcuate shape that bulges and is curved, maintaining the orientation toward the front surface side. The boundary between the first arcuate surface 16 and the first surface 12 is defined as a first boundary 20. On the rear surface side of the glass plate 10, an inclined part 18 is provided at the outer circumferential edge part bounding the second surface 14. The inclined part 18 is inclined upward from the second surface 14 toward the first arcuate surface 16 and is connected to the first arcuate surface 16 at an outer circumferential edge 22.

As shown in FIG. 4, a half mirror part 32 is provided on the rear surface side of the second surface 14. In other words, the half mirror part 32 is provided between the glass plate 10 and the frame 40. The half mirror part 32 is a mirror that reflects a portion of incident light and transmits a portion of light such that the intensity of incident light and that of transmitted light are substantially equal. The half mirror part 32 has a rectangular shape that conforms to the second surface 14. Instead of the half mirror part 32, a highly transmissive mirror part may be used. Reference to the half mirror part 32 may be omitted in the following description.

The rear surface side of the half mirror part 32 and the opposing surface 42 of the frame 40 are adhesively attached by the double-sided adhesive tape 30. Therefore, the second surface 14 of the glass plate 10 and the opposing surface 42 of the frame 40 face each other at a distance. The opposing surface 42 has a stepped shape in which the outer circumferential edge part is higher than the inner circumferential edge part where the double-sided adhesive tape 30 is provided. For example, when the double-sided adhesive tape 30 is provided, the distance between the second surface 14 and the opposing surface 42 in the inner circumferential edge part is 0.4 mm, and the distance between the second surface 14 and the opposing surface 42 in the outer circumferential edge part is 0.3 mm.

In the outer circumferential edge part of the opposing surface 42 is provided a projection 46 that bounds the outer circumferential edge part and, at the same time, projects toward the second surface 14 or the inclined part 18 of the glass plate 10 The surface to the right of the projection 46 is included in a second arcuate surface 44, and the second arcuate surface 44 is connected to the side surface 50. The second arcuate surface 44 is provided in a portion of the side surface 50 toward the glass plate 10. The boundary between the second arcuate surface 44 and the side surface 50 is shown as a second boundary 48. The second arcuate surface 44 has an arcuate shape continuous with the arcuate shape of the first arcuate surface 16. The arcuate shape is defined by an arc center C and an arc radius R. The arc center C and the arc radius R of the first arcuate surface 16 and the arc center C and the arc radius R of the second arcuate surface 44 are substantially identical, respectively. The combination of the first arcuate surface 16 and the second arcuate surface 44 forms an arcuate shape.

By forming an arcuate shape using the combination of the first arcuate surface 16 and the second arcuate surface 44, the length of the glass plate 10 in the x axis direction, i.e., the thickness, can be made smaller than the arc radius R. A description will be given of the advantage of providing the second arcuate surface 44 through a comparison with the case of not providing the second arcuate surface 44. FIGS. 6A-6B show an advantage in the vehicle-mounted display device 100. The figures show an appearance similar to that of FIG. 5. FIG. 6A shows a structure of a related-art device 110 in which the second arcuate surface 44 is not provided. The related-art device 110 includes the glass plate 10 of FIG. 5 but includes a frame 140 instead of the frame 40. The frame 140 includes a projection 146 and a side surface 150. The projection 146 corresponds to the projection 46, and the side surface 150 corresponds to the side surface 50. In the frame 140, the second arcuate surface 44 is not provided in a portion of the side surface 150 toward the glass plate 10. Therefore, the side surface 150 and the surface to the right of the projection 146 are flush.

"UN Regulation No. 46 Indirect Vision Devices" mentioned above defines a collision test using an elastic spherical object 500 having a diameter of 165 mm. As shown in FIG. 6A, the spherical object 500 caused to collide with the related-art device 110 comes into contact with the glass plate 10 and also comes into contact with the frame 140. In particular, the spherical object 500 comes into contact with the tip of the projection 146 in the frame 140, but the spherical object 500 does not easily come into contact with the side surface 150 even if the spherical object 500 is deformed because the distance between the straight side surface 150 and the spherical object 500 is large. Therefore, the load from the collision with the spherical object 500 is imposed on the tip of the projection 146 so that the tip of the projection 146 is easily damaged.

FIG. 6B shows an appearance similar to that of FIG. 5. When the spherical object 500 is caused to collide with the vehicle-mounted display device 100, the spherical object 500 comes into contact with the frame 40 as well as coming into contact with the glass plate 10. In particular, the spherical object 500 comes into contact with the tip of the projection 46 in the frame 40, and the spherical object 500 is deformed and comes into contact with the second arcuate surface 44 because the distance between the second arcuate surface 44 and the spherical object 500 is small. Therefore, the load from the collision with the spherical object 500 spreads in the second arcuate surface 44 so that the tip of the projection 46 is not easily damaged. Reference is made back to FIG. 5.

FIGS. 7A-7D show various structures of the glass plate 10. The figures show an appearance similar to that of FIG. 5, but the components other than the glass plate 10 are omitted from the illustration. In the illustrated structures, the arc center C and the arc radius R are common, but the thickness of the glass plate 10 is changed. The arc radius R is made to be 2.6 mm.

Figure 7A:
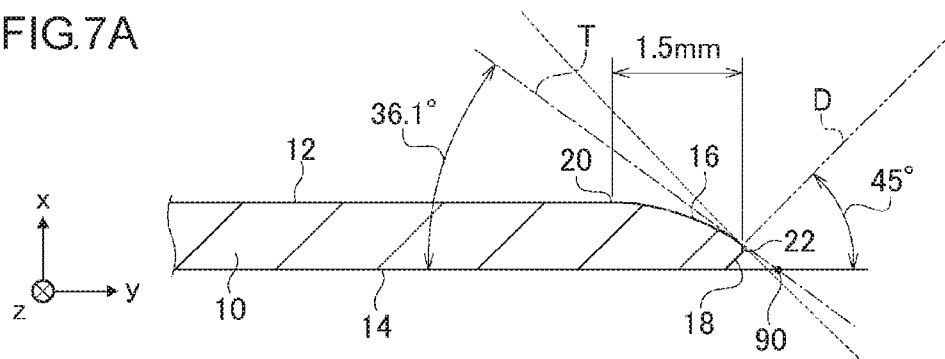
FIGS. 7A-7D show various structures of the glass plate of FIG. 5.

FIG. 7A shows a structure of the glass plate 10 having a thickness of 0.8 mm. In the case the thickness is 0.8 mm, the horizontal length from the first boundary 20 to the outer circumferential edge 22, i.e., the horizontal length of the first arcuate surface 16 is 1.5 mm. The tangential line T passing through the outer circumferential edge 22 and the line extending from the second surface 14 intersect at an intersection 90. The inclination of the tangential line T with respect to the second surface 14 at the intersection 90 is 36.1° as illustrated. The trajectory in which the spherical object 500 approaches in the aforementioned collision test using the spherical object 500 is denoted by a collision line D. The collision line D has an inclination of 45° with respect to the line extending from the second surface 14.

Figure 7B:
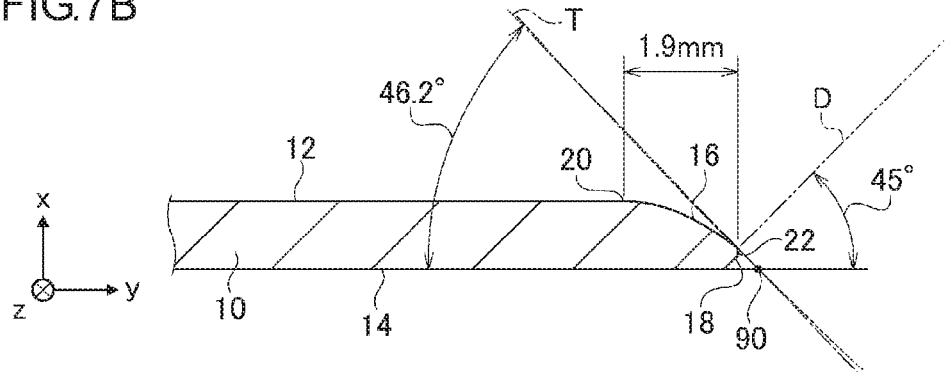
Figure 7C:
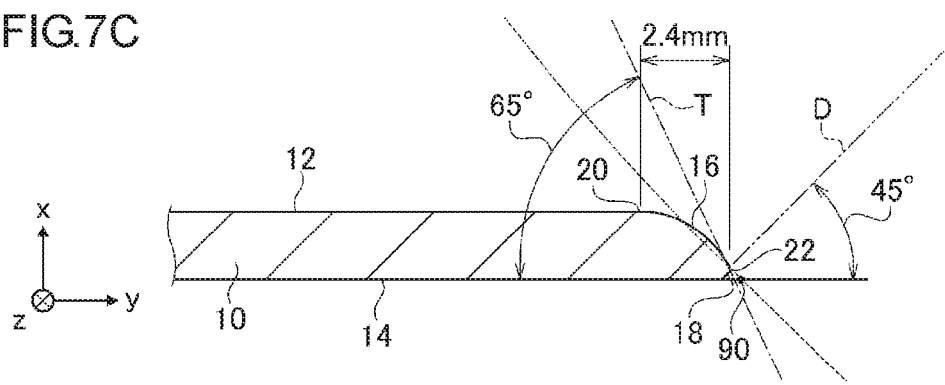
Figure 7D:
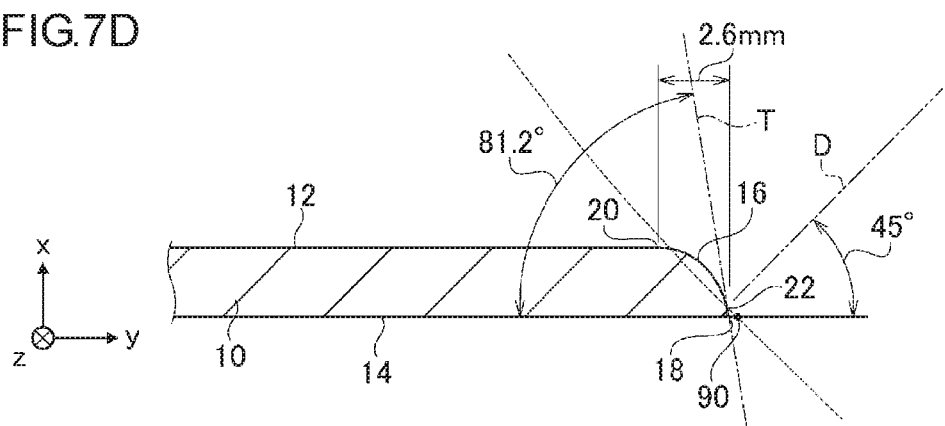

FIG. 7B shows a structure of the glass plate 10 having a thickness of 1.1 mm. In the case the thickness is 1.1 mm, the horizontal length of the first arcuate surface 16 is 1.9 mm as illustrated. The inclination of the tangential line T with respect to the second surface 14 at the intersection 90 is 46.2° as illustrated. FIG. 7C shows a structure of the glass plate 10 having a thickness of 1.8 mm. In the case the thickness is 1.8 mm, the horizontal length of the first arcuate surface 16 is 2.4 mm as illustrated. The inclination of the tangential line T with respect to the second surface 14 at the intersection 90 is 65° as illustrated. FIG. 7D shows a structure of the glass plate 10 having a thickness of 2.5 mm. In the case the thickness is 2.5 mm, the horizontal length of the first arcuate surface 16 is 2.6 mm as illustrated. The inclination of the tangential line T with respect to the second surface 14 at the intersection 90 is 81.2° as illustrated.

When the spherical object 500 is caused to collide with the glass plate 10 in the direction of the collision line D, the spherical object 500 directly comes into contact with the outer circumferential edge 22 and does not easily come into contact with the first arcuate surface 16 if the inclination of the tangential line T with respect to the second surface 14 is smaller than 40° at the intersection 90. Therefore, the glass plate 10 is easily damaged if the aforementioned inclination is smaller than 45°. Thus, it is preferred that the thickness of the glass plate 10 be 1.1 mm or larger that makes the aforementioned inclination 45° or larger, in order to reduce the likelihood of damage to the glass plate 10. Further, if the glass having a thickness larger than the arc radius R is provided with the first arcuate surface 16 having the arc radius R, the first arcuate surface 16 having the length of the arc radius R is visible when the first arcuate surface 16 is viewed from the front surface side. In order to give the first arcuate surface 16 a good appearance, it is preferred that the length of the first arcuate surface 16 as viewed from the front surface side approximate 2.6 mm. It is therefore preferred that the thickness of the glass plate 10 be 1.8 mm or larger. Further, it is preferred that the thickness of the glass plate 10 be as small as possible for the purpose of reducing the weight of the glass plate 10. To summarize the above, the thickness of the glass plate 10 is made to be, for example, 1.8 mm.

FIG. 8 shows physical property values of glass used in the glass plate 10. Glass A represents an unreinforced glass, and glass B represents reinforced glass. In order to secure visibility on a snowy road on a clear and sunny day, the brightness of the vehicle-mounted display device 100 of 1100 cd/m² or larger is necessary. In consideration of power consumption and amount of heat generation, glass having a transmittance of 90% or higher is employed. In consideration of a temperature increase of +25° in an environment of 85°, the softening temperature of 110° or higher is necessary. The Vickers hardness of 500 HV or higher and the bending fracture strength of 40 MPa or higher are necessary so as not to damage the glass in the aforementioned collision test using the spherical object 500. Glass A meets these conditions so that glass A is employed in the glass plate 10. Glass B may be used in the glass plate 10.

FIGS. 9A-9B show another structure of the vehicle-mounted display device 100. The figures show an appearance similar to that of FIG. 5. FIG. 9A shows that the projection 46 in the structure of FIG. 5 is not included. However, the second arcuate surface 44 is provided in a portion of the side surface 50 toward the glass plate 10. FIG. 9B shows a structure in which the length of the projection 46 toward the front surface side is longer as compared with the structure of FIG. 5. The projection 46 in FIG. 5 does not reach the second surface 14, but the projection 46 in FIG. 9B reaches the second surface 14. The surface to the left of the projection 46 is provided along the inclined part 18.

According to the embodiment, the center and the radius of the first arcuate surface in the glass plate and those of the second arcuate surface in the casing are made to be identical so that a single arcuate surface is formed by combining the first arcuate surface and the second arcuate surface. Since a single arcuate surface is formed by combining the first arcuate surface and the second arcuate surface, the thickness of the glass plate is inhibited from being increased, while the arcuate shape at the outer circumferential edge of the glass plate is maintained at the same time. Since a projection, a portion of which is included in the second arcuate surface, is provided, the gap between the glass plate and the casing is reduced. Since the gap between the glass plate and the casing is reduced, the double-sided adhesive tape is shielded from view. Since the double-sided adhesive taps is shielded from view, the appearance is improved. Provision of the projection serves as a guide in attaching the glass plate to the frame using a jig so that the assembly of the vehicle-mounted display device is facilitated. Provision of the projection gives the user holding the casing to adjust the angle a good feel.

Since the thickness of the glass plate is made to be smaller than the radius of the first arcuate surface, the thickness of the glass plate is reduced. Since the thickness of the glass plat is reduced, the weight of the glass plate is reduced. Since the thickness of the glass plate is reduced, the cost of the glass plate is reduced. Since the thickness of the glass plate is made to be 1.1 mm or larger and the radius of the first arcuate surface is made to be 2.5 mm or larger, the strength against the collision of a spherical object is increased. Since the thickness of the glass plate is made to be 1.8 mm, the requirement for strength against the collision of a spherical object and the requirement for light weight are met at the same time. Further, since the bending fracture strength is made to be 40 MPa or larger, and the Vickers hardness of the glass plate is made to be 500 HV or higher, the strength of the glass plate is increased.

One embodiment of the present disclosure is summarized below. A rear-view mirror device according to an embodiment of the disclosure includes: a glass plate that includes a first arcuate surface at an outer circumferential edge part, the first arcuate surface facing a front surface side; a casing that supports the glass plate from a rear surface side and includes a second arcuate surface in a portion toward the glass plate; and a reflective layer provided between the casing and the glass plate.
A center and a radius of the second arcuate surface are made to be identical to a center and a radius of the first arcuate surface, respectively.

According to the embodiment, the center and the radius of the first arcuate surface in the glass plate and the center and the radius of the second arcuate surface in the casing are made to be identical so that the thickness of the glass plate is inhibited from being increased while the arcuate shape at the outer circumferential edge of the glass plate is maintained at the same time.

A rear surface of the glass plate and a front surface of the casing may face each other at a distance, and the casing may further include a projection that projects toward the rear surface of the glass plate at an outer circumferential edge part of a surface of the casing. A portion of the projection is included in the second arcuate surface. In this case, the projection, a portion of which is included in the second arcuate surface, is provided so that the gap between the glass plate and the casing is reduced.

A thickness between a front surface and a rear surface of the glass plate is smaller than the radius of the first arcuate surface. In this case, the thickness of the glass plate is made to be smaller than the radius of the first arcuate surface so that the thickness of the glass plate is reduced.

A thickness of the glass plate may be 1.1 mm or larger, and the radius of the first arcuate surface may be 2.5 mm or larger. In this case, the thickness of the glass plate is made to be 1.1 mm or larger, and the radius of the first arcuate surface is made to be 2.5 mm or larger so that the strength against the collision of a spherical object is increased.

The thickness of the glass plate may be 1.8 mm. In this case, the thickness of the glass plate is made to be 1.8 mm so that the requirement for the strength against the collision of a spherical object and the requirement for light weight are met at the same time.

A bending fracture strength of the glass plate may be 40 MPa or larger, and a Vickers hardness of the glass plate may be 500 HV or higher. In this case, the bending fracture strength is made to be 40 MPa or larger, and the Vickers hardness of the glass plate is made to be 500 HV or higher so that the strength of the glass plate is increased.

Another embodiment of the present disclosure relates to a vehicle-mounted display device. The device includes: a glass plate that includes a first arcuate surface at an outer circumferential edge part, the first arcuate surface facing a front surface side; a casing that supports the glass plate from a rear surface side and includes a second arcuate surface in a portion toward the glass plate; and a display unit stored in the casing and outputting a display light toward the glass plate. A center and a radius of the second arcuate surface are made to be identical to a center and a radius of the first arcuate surface, respectively.

According to the embodiment, the center and the radius of the first arcuate surface in the glass plate and the center and the radius of the second arcuate surface in the casing are made to be identical so that the thickness of the glass plate is inhibited from being increased while the arcuate shape at the outer circumferential edge of the glass plate is maintained at the same time.

The vehicle-mounted display device may further include a half mirror part provided between the casing and the glass plate. In this case, the half mirror part is provided so that the device is provided with the function of a half mirror.

A rear surface of the glass plate and a front surface of the casing may face each other at a distance, and the casing may further include a projection that projects toward the rear surface of the glass plate at an outer circumferential edge part of a surface of the casing. A portion of the projection is included in the second arcuate surface. In this case, the projection, a portion of which is included in the second arcuate surface, is provided so that the gap between the glass plate and the casing is reduced.

A thickness between a front surface and a rear surface of the glass plate is smaller than the radius of the first arcuate surface. In this case, the thickness of the glass plate is made to be smaller than the radius of the first arcuate surface so that the thickness of the glass plate is reduced.

A thickness of the glass plate may be 1.1 mm or larger, and the radius of the first arcuate surface may be 2.5 mm or larger. In this case, the thickness of the glass plate is made to be 1.1 mm or larger, and the radius of the first arcuate surface is made to be 2.5 mm or larger so that the strength against the collision of a spherical object is increased.

The thickness of the glass plate may be 1.8 mm. In this case, the thickness of the glass plate is made to be 1.8 mm so that the requirement for the strength against the collision of a spherical object and the requirement for light weight are met at the same time.

A bending fracture strength of the glass plate may be 40 MPa or larger, and a Vickers hardness of the glass plate may be 500 HV or higher. In this case, the bending fracture strength is made to be 40 MPa or larger, and the Vickers hardness of the glass plate is made to be 500 HV or higher so that the strength of the glass plate is increased.

Another embodiment of the present disclosure relates to a vehicle-mounted display system. The vehicle-mounted display system includes an imaging device that captures an image; and a vehicle-mounted display device that displays the image captured by the imaging device. The vehicle-mounted display device includes: a glass plate that includes a first arcuate surface at an outer circumferential edge part, the first arcuate surface facing a front surface side; a casing that supports the glass plate from a rear surface side and includes a second arcuate surface in a portion toward the glass plate; and a display unit stored in the casing and outputting a display light reflecting the image toward the glass plate. A center and a radius of the second arcuate surface are made to be identical to a center and a radius of the first arcuate surface, respectively.

According to the embodiment, the center and the radius of the first arcuate surface in the glass plate and the center and the radius of the second arcuate surface are made to be identical so that the thickness of the glass plate is inhibited from being increased while the arcuate shape at the outer circumferential edge of the glass plate is maintained at the same time.

Described above is an explanation based on an exemplary embodiment. The embodiment is intended to be illustrative only and it will be understood by those skilled in the art that various modifications to constituting elements and processes could be developed and that such modifications are also within the scope of the present invention.

In this embodiment, the glass plate 10 is included in the vehicle-mounted display device 100. Alternatively, however, the glass plate 10 may be included in the rear-view mirror device. In the rear-view mirror device, the frame 40 and the housing 60 may be integrated as the casing 80. A reflective layer is provided between the glass plate 10 and the casing 80 instead of the half mirror part 32. Further, the display unit 70 is not included in the rear-view mirror device. According to this variation, the scope of application of the embodiment is extended.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2018-064475, filed on Mar. 29, 2018, the entire contents of which are incorporated herein by reference.

What is claimed is:

1. A vehicle-mounted display device comprising:
    a glass plate that includes a first arcuate surface at a first outer circumferential edge part, the first arcuate surface facing a front surface side;
    a casing that supports the glass plate from a rear surface side, the casing including a housing and a frame that projects from the housing; and
    a display unit stored in the casing configured to output a display light toward the glass plate, wherein
    a rear surface of the glass plate and a front surface of the frame face each other at a spaced distance,
    the frame further includes a projection that projects entirely within the spaced distance from the front surface of the frame toward the rear surface of the glass plate at a second outer circumferential edge part of the front surface of the frame, and
    the projection includes a second arcuate surface.

2. The vehicle-mounted display device according to claim 1, further comprising:
    a half mirror part provided between the casing and the glass plate.

3. The vehicle-mounted display device according to claim 1, wherein
a thickness between a front surface and the rear surface of the glass plate is smaller than a radius of the first arcuate surface.

4. The vehicle-mounted display device according to claim 1, wherein
a thickness of the glass plate is 1.1 mm or larger, and a radius of the first arcuate surface is 2.5 mm or larger.

5. The vehicle-mounted display device according to claim 1, wherein
an inclined part is provided on the rear surface side of the glass plate and is inclined upward from the rear surface of the glass plate toward the first arcuate surface, and
the projection projects toward the inclined part.

6. The vehicle-mounted display device according to claim 5, wherein
a width of the projection is wider than a width of the inclined part.

7. The vehicle-mounted display device according to claim 6, wherein
the projection includes an inner surface provided along the inclined part.

8. The vehicle-mounted display device according to claim 1, wherein
the front surface of the frame has an inner circumferential edge part which is located at an inner side of the second outer circumferential edge part, and
a distance between the rear surface of the glass plate and the second outer circumferential edge part is smaller than a distance between the rear surface of the glass plate and the inner circumferential edge part.

9. A rear-view mirror device comprising:
a glass plate that includes a first arcuate surface at a first outer circumferential edge part, the first arcuate surface facing a front surface side;
a casing that supports the glass plate from a rear surface side, the casing including a housing and a frame that projects from the housing, the frame including a second arcuate surface in a portion extending toward the first outer circumferential edge part of the glass plate; and
a reflective layer provided between the frame and the glass plate, wherein
a rear surface of the glass plate and a front surface of the frame face each other at a spaced distance,
the frame further includes a projection that projects entirely within the spaced distance from the front surface of the frame toward the rear surface of the glass plate at a second outer circumferential edge part of the front surface of the frame; and
a portion of the projection is included in the second arcuate surface.

10. The rear-view mirror device according to claim 9, wherein
a thickness between a front surface and the rear surface of the glass plate is smaller than a radius of the first arcuate surface.

11. The rear-view mirror device according to claim 9, wherein
a thickness of the glass plate is 1.1 mm or larger, and a radius of the first arcuate surface is 2.5 mm or larger.

12. The rear-view mirror device according to claim 9, wherein
an inclined part is provided on the rear surface side of the glass plate and is inclined upward from the rear surface of the glass plate toward the first arcuate surface, and
the projection projects toward the inclined part.

13. The rear-view mirror device according to claim 12, wherein
a width of the projection is wider than a width of the inclined part.

14. The vehicle-mounted display device according to claim 12, wherein
the projection includes an inner surface provided along the inclined part.

15. The rear-view mirror device according to claim 9, wherein
the front surface of the frame has an inner circumferential edge part which is located at an inner side of the second outer circumferential edge part, and
a distance between the rear surface of the glass plate and the second outer circumferential edge part is smaller than a distance between the rear surface of the glass plate and the inner circumferential edge part.

16. A vehicle-mounted display device comprising:
a glass plate that includes a first arcuate surface at a first outer circumferential edge part, the first arcuate surface facing a front surface side;
a casing that supports the glass plate from a rear surface side, the casing including a housing and a frame that projects from the housing, the frame including a second arcuate surface in a portion extending toward the first outer circumferential edge part of the glass plate; and
a display unit stored in the casing configured to output a display light toward the glass plate, wherein
a rear surface of the glass plate and a front surface of the frame face each other at a spaced distance,
the frame further includes a projection that projects entirely within the spaced distance from the front surface of the frame toward the rear surface of the glass plate at a second outer circumferential edge part of the front surface of the frame, and
a portion of the projection is included in the second arcuate surface.

17. The vehicle-mounted display device according to claim 16, wherein
an inclined part is provided on the rear surface side of the glass plate and is inclined upward from the rear surface of the glass plate toward the first arcuate surface, and
the projection projects toward the inclined part.

18. The vehicle-mounted display device according to claim 17, wherein
a width of the projection is wider than a width of the inclined part.

19. The vehicle-mounted display device according to claim 17, wherein
the projection includes an inner surface provided along the inclined part.

20. The vehicle-mounted display device according to claim 16, wherein the front surface of the frame has an inner circumferential edge part which is located at an inner side of the second outer circumferential edge part, and
a distance between the rear surface of the glass plate and the second outer circumferential edge part is smaller than a distance between the rear surface of the glass plate and the inner circumferential edge part.

* * * * *